(12) United States Patent
Gabrielsson

(10) Patent No.: US 11,313,264 B2
(45) Date of Patent: Apr. 26, 2022

(54) METHOD AND SYSTEM FOR THE REMOVAL OF NOXIOUS COMPOUNDS FROM ENGINE EXHAUST GAS

(71) Applicant: UMICORE AG & CO. KG, Hanau-Wolfgang (DE)

(72) Inventor: Pär L. T. Gabrielsson, Helsingborg (SE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 240 days.

(21) Appl. No.: 16/500,463

(22) PCT Filed: Mar. 27, 2018

(86) PCT No.: PCT/EP2018/057802
§ 371 (c)(1),
(2) Date: Oct. 3, 2019

(87) PCT Pub. No.: WO2018/184921
PCT Pub. Date: Oct. 11, 2018

(65) Prior Publication Data
US 2020/0191035 A1   Jun. 18, 2020

(30) Foreign Application Priority Data
Apr. 6, 2017   (DK) .............................. PA201700240

(51) Int. Cl.
| | |
|---|---|
| *F01N 3/20* | (2006.01) |
| *F01N 3/035* | (2006.01) |
| *F01N 3/021* | (2006.01) |
| *F01N 13/00* | (2010.01) |

(Continued)

(52) U.S. Cl.
CPC .......... *F01N 3/2066* (2013.01); *F01N 3/021* (2013.01); *F01N 3/035* (2013.01); *F01N 3/0231* (2013.01); *F01N 3/103* (2013.01); *F01N 3/106* (2013.01); *F01N 13/009* (2014.06); *F01N 2570/14* (2013.01); *F01N 2610/02* (2013.01)

(58) Field of Classification Search
CPC ...... F01N 13/009; F01N 3/2066; F01N 3/106; F01N 3/021; F01N 2610/02
See application file for complete search history.

(56) References Cited

U.S. PATENT DOCUMENTS

| | | |
|---|---|---|
| 8,220,254 B2 | 7/2012 | Doring |
| 2013/0340413 A1 | 12/2013 | Chandler et al. |
| 2014/0170030 A1 | 6/2014 | Singh et al. |

(Continued)

FOREIGN PATENT DOCUMENTS

| | | |
|---|---|---|
| CN | 103912346 A | 7/2014 |
| CN | 104136099 A | 11/2014 |

(Continued)

OTHER PUBLICATIONS

International Preliminary Report on Patentability dated Oct. 8, 2019 in International Patent Application No. PCT/EP2018/057802 (5 Pages).

(Continued)

*Primary Examiner* — Ngoc T Nguyen
(74) *Attorney, Agent, or Firm* — Smith, Gambrell & Russell, LLP

(57) ABSTRACT

Method and system for the removal of nitrogen oxides, volatile organic compounds and particulate matter from engine exhaust gas at cold start conditions.

12 Claims, 1 Drawing Sheet

(51) Int. Cl.
  *F01N 3/023*  (2006.01)
  *F01N 3/10*  (2006.01)

(56) References Cited

U.S. PATENT DOCUMENTS

2015/0020506 A1   1/2015   Johansen
2015/0027104 A1   1/2015   Bush

FOREIGN PATENT DOCUMENTS

| DE | 20 2007 018 423 U1 | 8/2008 |
| EP | 2 075 050 A2 | 7/2009 |
| EP | 2 166 207 A1 | 3/2010 |
| EP | 2 802 751 A1 | 11/2014 |
| WO | 99/36162 | 7/1999 |

OTHER PUBLICATIONS

International Search Report for PCT/EP2018/057802, dated May 11, 2018 (3 pgs.).
Written Opinion of the International Searching Authority for PCT/EP2018/057802, dated May 11, 2018 (6 pgs.).
Chinese Office Action dated Mar. 19, 2021 for Chinese Patent Application No. 201880019621.0 (8 pages in Chinese with English Translation).

METHOD AND SYSTEM FOR THE REMOVAL OF NOXIOUS COMPOUNDS FROM ENGINE EXHAUST GAS

The present invention relates to a method and system for reducing emission of nitrogen oxides (NOx) and particulate matter being present in engine exhaust gas. In particular, the method and system of the invention provides an improved reduction of NOx during cold start of the engine.

Typically, exhaust gas cleaning systems of vehicles or stationary engines with lean burning engines are equipped with an oxidation catalyst, a particulate filter and a catalyst for the selective reduction of NOx (SCR) in the presence of a reducing agent.

Oxidation catalysts being active in the oxidation of volatile organic compounds, nitrogen monoxide and carbon monoxide and SCR catalysts are known in the art and disclosed in numerous publications.

The problem with the known SCR catalysts is the relatively low efficiency at exhaust gas temperatures below 250° C.

In particular, cold start emission abatement is an important issue when certifying engines. Different approaches have been explored most of them are based on heating up the exhaust by different engine measures but often lead to a worsened fuel efficiency.

It is known that the SCR reaction can be considerably accelerated, and the low temperature activity can be significantly raised at equimolar amounts of NO and $NO_2$ in the exhaust gas by the so-called "fast" SCR reaction:

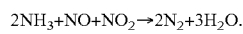

$$2NH_3+NO+NO_2 \rightarrow 2N_2+3H_2O.$$

The usual approach to increase the amount of $NO_2$ is to use an oxidation catalyst upstream the SCR catalyst to oxidize the NO to $NO_2$. The problem, however, is that the efficiency of the oxidation catalyst at cold start condition is poor and very low levels of $NO_2$ are formed at exhaust gas temperature below 200° C.

This invention is based on forming $NO_2$ externally to the exhaust gas cleaning system in an exhaust gas channel and injecting the prepared $NO_2$ into the engine exhaust gas in an amount that promotes the fast SCR reaction. $NO_2$ can be formed from $NH_3$ by oxidation of the $NH_3$ to NO over a precious metal containing catalyst in a first step and subsequently oxidized $NO_2$ in a subsequent step.

Figure 1:
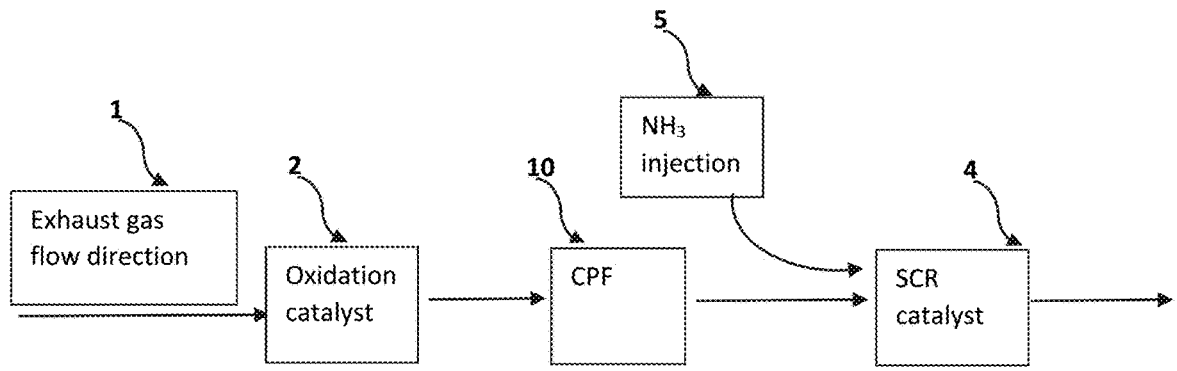
FIG. 1 shows a schematic view of a conventional SCR reactor model.
Figure 2:
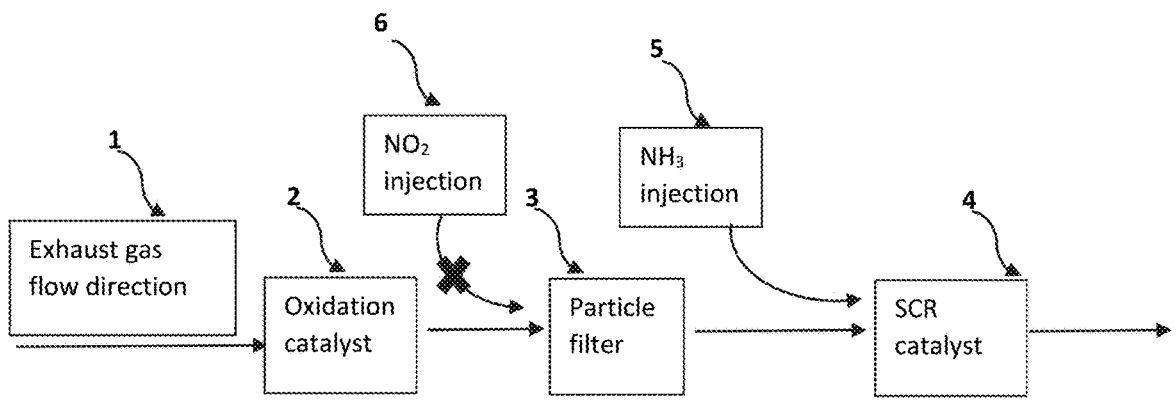
FIG. 2 shows, schematically, an example of a method/system in accordance with the present invention.
Figure 3:
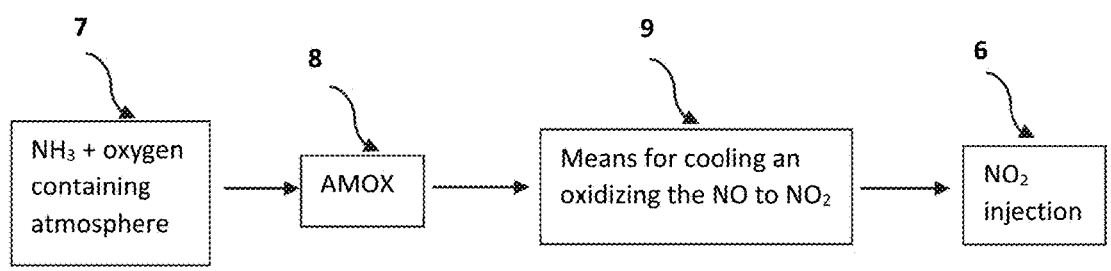
FIG. 3 shows, schematically, an example of method/system for NO2 generation.

Thus, the invention provides in a first aspect a method for the removal of nitrogen oxides, volatile organic compounds and particulate matter from engine exhaust gas comprising the steps of passing the engine exhaust gas in series through an oxidation catalyst, through a particle filter and a catalyst for selective reduction of nitrogen oxides in presence of ammonia added to the engine exhaust gas either as such or in form of a precursor thereof;

at an engine exhaust gas temperature of below 250° C. injecting an effluent gas containing nitrogen dioxide into the engine exhaust gas upstream the catalyst for selective reduction of nitrogen oxides;

providing the effluent gas containing nitrogen dioxide by steps of catalytically oxidizing ammonia with an oxygen containing atmosphere to an effluent gas comprising nitrogen monoxide and oxygen in presence of an oxidation catalyst;

cooling the effluent gas to ambient temperature and oxidizing the nitrogen monoxide in the cooled effluent gas to nitrogen dioxide.

Cleaning methods and systems for use in the cleaning of engine exhaust gas from a compression ignition engine comprising passing the engine exhaust gas in series through an oxidation catalyst (DOC), through a particle filter (PDF) and a catalyst for selective catalytic reduction of nitrogen oxides (SCR) in presence of ammonia added to the engine exhaust gas either as such or in form of urea precursor are per se known in the art.

The problem with the known methods and systems is the relatively low efficiency of the SCR catalyst at cold start conditions below exhaust gas temperatures at 250° C., as mentioned hereinbefore. This problem is solved by the invention with injection of $NO_2$ into the engine exhaust gas during cold start temperatures to promote the "fast" SCR reaction. This reaction is responsible for the promotion of low temperature SCR by $NO_2$.

Above 250° C. NO contained in the engine exhaust gas, when leaving the engine is oxidised to $NO_2$ by contact with the DOC. Thus, above temperatures of 250° C. all the amount of formed $NO_2$ can be used for passive soot regeneration of the filter and the fast SCR reaction.

Consequently, injection of $NO_2$ into the engine exhaust gas can be disrupted when the gas temperature reaches 250° C.

Ammonia oxidation to NO, is usually performed in a reactor with a noble metal catalyst, typically platinum or an alloy of platinum with other precious metals as minor components at reaction temperatures of between 250 and 800° C. in presence of oxygen containing atmosphere, like air.

To provide the required reaction temperature, the oxidation reactor can be heated by e.g. electrical heating or induction heating.

In an embodiment, the oxygen containing atmosphere includes hot recirculated engine exhaust gas which provides than additionally part of the oxidation reactor heating duty.

NO formed from $NH_3$ by oxidation of the $NH_3$ in contact with a precious metal containing catalyst in a first step, is subsequently oxidized to $NO_2$ in the NO containing effluent gas from the first step by cooling the gas to ambient temperature to push the equilibrium reaction $2NO+O_2 \leftrightharpoons 2NO_2$ towards formation of $NO_2$ in the above reaction scheme.

The term "ambient temperature" as used herein, shall mean any temperature prevailing in the surroundings of a vehicle or stationary engine employing the method and system of the invention. Typically, the ambient temperature will be between −20° C. and 40° C.

Cooling and oxidation of the NO containing effluent gas can be performed in an aging reactor sized so that the residence time of the gas is about 1 minute or longer.

In an embodiment the oxidation reaction is performed in presence of a catalyst promoting the oxidation of NO to $NO_2$. Those catalysts are known in the art and include Pt on $TiO_2$, Pt on $SiO_2$ and activated carbon.

As mentioned hereinbefore the desired fast SCR reaction requires equal amounts of NO and $NO_2$. Consequently, the amount of $NO_2$ injected into the engine exhaust gas at cold start conditions with a temperature below 250° C. is controlled to result in 45 to 55% by volume of the nitrogen oxides content in the engine exhaust gas is $NO_2$ at inlet to the SCR catalyst unit.

$NO_2$ can be used to oxidize soot particles captured on the DPF and is useful in the passive regeneration of the DPF.

Thus, in an embodiment of the invention, effluent gas containing nitrogen dioxide is injected upstream the particle filter.

In order to facilitate a reliable DPF regeneration by combustion of accumulated soot and simultaneously remove hydrocarbons and carbon monoxide, the DPF is preferably provided with a catalytic coating.

Catalysts active in soot combustion are per se known in the art. An example of such a catalyst is palladium combined with $CeO_2$ stabilized with $ZrO_2$ or platinum on alumina.

Above 250° C. the NO in the exhaust gas is oxidised to $NO_2$ by contact with the DOC. The formed $NO_2$ is used in the passive regeneration of the DPF. Thus, above temperatures of 250° C. all the amount of formed $NO_2$ can be used for passive soot regeneration of the filter and to promote the fast SCR and injection of $NO_2$ containing gas is disrupted.

In a further aspect, the invention provides a system for use in the method according to the invention.

The system comprises within an engine exhaust gas channel in series, an oxidation catalyst unit for the oxidation of volatile organic compounds and carbon monoxide to carbon dioxide and water and nitrogen oxide to nitrogen dioxide;

a particle filter;

a catalyst for selective reduction of nitrogen oxides;

upstream the catalyst for selective reduction of nitrogen oxides, injection means for injection of ammonia or a urea solution into the engine exhaust gas channel;

upstream the catalyst for selective reduction of nitrogen oxides, injection means for injection of nitrogen dioxide containing effluent gas; and outside the exhaust gas channel, an ammonia oxidation catalyst; and means for cooling and oxidizing nitrogen monoxide containing effluent gas from the ammonia oxidation catalyst connected at its outlet end to the injection means for injection of nitrogen dioxide containing effluent gas.

In an embodiment of the invention, the injection means for injection of nitrogen dioxide containing effluent gas is arranged upstream the particle filter. With this embodiment passive regeneration of the particle filter is possible at lower temperatures, before the engine exhaust gas reaches a temperature at which the upstream oxidation catalyst generates sufficient amounts of $NO_2$.

As mentioned above, the oxidation reaction of NO to $NO_2$ needs a residence time of the NO containing gas of about 1 minute. Typically, 1-2 minutes.

This can be achieved, preferably when shaping the cooling and oxidizing means as a spirally wound tube with a length resulting in the desired residence time of the gas passing through the tube.

In another embodiment, the means for cooling and oxidizing nitrogen monoxide containing effluent gas is provided with an oxidation catalyst promoting the oxidation of NO to NO2.

In further an embodiment, the particle filter is catalysed with catalyst active in burning off soot.

Listing of Reference Nos.
1: Exhaust gas flow direction
2: Oxidation catalyst
3. Particle filter
4. SCR catalyst
5. $NH_3$ injection
6. $NO_2$ injection
7. $NH_3$+oxygen containing atmosphere
8. AMOX
9. Means for cooling an oxidizing the NO to $NO_2$
10. Catalysed Particle Filter (CPF)

The invention claimed is:

1. A method for the removal of nitrogen oxides, volatile organic compounds and particulate matter from engine exhaust gas, comprising the steps of passing the engine exhaust gas in series through an exhaust gas channel oxidation catalyst, through a particle filter and a catalyst for selective reduction of nitrogen oxides in presence of ammonia added to the engine exhaust gas either as such or in form of a precursor thereof;

at an engine exhaust gas temperature of below 250° C. injecting an effluent gas containing nitrogen dioxide into the engine exhaust gas upstream the catalyst for selective reduction of nitrogen oxides;

providing the effluent gas containing nitrogen dioxide by steps of catalytically oxidizing ammonia or a precursor thereof with an oxygen containing atmosphere to an effluent gas comprising nitrogen monoxide and oxygen in presence of an ammonia oxidation catalyst;

cooling the effluent gas to ambient temperature and oxidizing the nitrogen monoxide in the cooled effluent gas to nitrogen dioxide.

2. The method of claim 1, wherein the oxygen containing atmosphere comprises engine exhaust gas.

3. The method of claim 1, wherein the oxygen atmosphere is ambient air.

4. The method according to claim 1, wherein effluent gas containing nitrogen dioxide is injected upstream of the particle filter.

5. The method according to claim 1, wherein the effluent gas containing nitrogen dioxide is injected into the engine exhaust gas in an amount resulting in 45 to 55% by volume of the nitrogen oxides is nitrogen dioxide at inlet to the catalyst for selective reduction of nitrogen oxides.

6. The method according to claim 1, wherein the oxidation of the nitrogen monoxide in the cooled effluent gas to nitrogen dioxide is performed in presence of an NO to NO2 oxidation catalyst.

7. The method according to claim 1, wherein the particle filter is catalysed with a catalyst active in burning off soot.

8. A system comprising, within an engine exhaust gas channel in series, an engine exhaust gas channel oxidation catalyst unit for the oxidation of volatile organic compounds and carbon monoxide to carbon dioxide and water and nitrogen oxide to nitrogen dioxide;

a particle filter;

a catalyst for selective reduction of nitrogen oxides;

a first injector that is positioned upstream of the catalyst for selective reduction of nitrogen oxides and injects ammonia or a urea solution into the engine exhaust gas channel;

a second injector that is also positioned upstream of the catalyst for selective reduction of nitrogen oxides and that injects into the engine exhaust gas channel nitrogen dioxide containing effluent gas; and arranged outside the exhaust gas channel, an ammonia oxidation catalyst; and means for cooling and oxidizing nitrogen monoxide containing effluent gas from the ammonia oxidation catalyst and which is connected at an outlet end to the second injector.

9. The system of claim 8, wherein the second injector is arranged upstream of the particle filter.

10. The system of claim 8, wherein the means for the cooling and oxidizing nitrogen monoxide containing effluent gas is in form of a spirally wound tube.

11. The system of claim 8, wherein the means for the cooling and oxidizing nitrogen monoxide containing effluent gas is provided with an NO to NO2 oxidation catalyst.

12. The system of claim 8, wherein the particle filter is catalysed with catalyst active in burning off soot.

* * * * *